US008543745B2

(12) United States Patent
Minoo et al.

(10) Patent No.: US 8,543,745 B2
(45) Date of Patent: Sep. 24, 2013

(54) ACCESSORY FOR A PORTABLE COMPUTING DEVICE

(75) Inventors: Jahan Minoo, South San Francisco, CA (US); Gregory T. Lydon, Santa Cruz, CA (US); Kenneth Loo, San Jose, CA (US); Lawrence G. Bolton, Fremont, CA (US); Roberto G. Yepez, San Francisco, CA (US); John M. Ananny, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 12/772,952

(22) Filed: May 3, 2010

(65) Prior Publication Data

US 2011/0167181 A1 Jul. 7, 2011

Related U.S. Application Data

(60) Provisional application No. 61/292,640, filed on Jan. 6, 2010.

(51) Int. Cl.
*G06F 3/00* (2006.01)
*G06F 5/00* (2006.01)
*G06F 13/12* (2006.01)
*G06F 13/38* (2006.01)

(52) U.S. Cl.
USPC ............ 710/73; 710/2; 710/5; 710/7; 710/20; 710/21; 710/36; 710/71

(58) Field of Classification Search
USPC .................................................... 710/1–100
See application file for complete search history.

(56) References Cited

U.S. PATENT DOCUMENTS

| 5,241,303 | A | 8/1993 | Register et al. |
| 5,627,450 | A | 5/1997 | Ryan et al. |
| 5,666,495 | A | 9/1997 | Yeh |
| 5,784,253 | A | 7/1998 | Ooka et al. |
| 5,841,424 | A | 11/1998 | Kikinis |
| 5,864,708 | A | 1/1999 | Croft et al. |
| 5,920,734 | A * | 7/1999 | Holmdahl ....................... 710/73 |
| 5,991,839 | A | 11/1999 | Ninomiya |
| 6,035,357 | A * | 3/2000 | Sakaki .......................... 710/301 |
| 6,256,193 | B1 | 7/2001 | Janik et al. |
| 6,418,013 | B1 | 7/2002 | Broder et al. |

(Continued)

FOREIGN PATENT DOCUMENTS

CN 1297176 5/2001

OTHER PUBLICATIONS

International Search Report and Written Opinion for Application No. PCT/US2010/050411 mailed on Apr. 11, 2011, 20 pages.

(Continued)

*Primary Examiner* — Idriss N Alrobaye
*Assistant Examiner* — Getente A Yimer
(74) *Attorney, Agent, or Firm* — Kilpatrick Townsend & Stockton LLP

(57) ABSTRACT

An accessory for use with a portable computing device is provided. The accessory includes a keypad and a pedestal to house the control circuitry and provide mechanical stability for the accessory. The accessory includes a metal mass that performs dual functions of providing the mass for stability as well as acting as a ground connection for the keypad and other control circuitry. The accessory includes a connector for interfacing with a portable computing device and an additional connector for interfacing with an additional accessory.

15 Claims, 7 Drawing Sheets

(56) References Cited

U.S. PATENT DOCUMENTS

| | | | |
|---|---|---|---|
| 6,463,487 B1* | 10/2002 | Ternullo | 710/63 |
| 6,549,416 B2 | 4/2003 | Sterner et al. | |
| 6,614,206 B1 | 9/2003 | Wong et al. | |
| 6,654,826 B1 | 11/2003 | Cho et al. | |
| 6,785,126 B2 | 8/2004 | Hazzard et al. | |
| 6,788,527 B2 | 9/2004 | Doczy et al. | |
| 6,856,506 B2 | 2/2005 | Doherty et al. | |
| 7,746,629 B2* | 6/2010 | Assouad et al. | 361/679.31 |
| 7,770,037 B2* | 8/2010 | Searles et al. | 713/300 |
| 7,876,764 B2* | 1/2011 | Binetti et al. | 370/395.53 |
| 7,890,781 B2* | 2/2011 | Gunther et al. | 713/300 |
| 2003/0084222 A1 | 5/2003 | Wurzburg | |
| 2006/0091897 A1 | 5/2006 | Park | |
| 2006/0248251 A1 | 11/2006 | Tracy et al. | |
| 2007/0032098 A1* | 2/2007 | Bowles et al. | 439/11 |
| 2007/0250721 A1 | 10/2007 | Searles et al. | |
| 2008/0028118 A1 | 1/2008 | Sayers et al. | |
| 2009/0015233 A1* | 1/2009 | Gunther et al. | 323/318 |
| 2010/0017636 A1* | 1/2010 | Hashimoto et al. | 713/322 |
| 2010/0027065 A1* | 2/2010 | Koakutsu | 358/1.15 |
| 2011/0167281 A1* | 7/2011 | Rathi et al. | 713/310 |

OTHER PUBLICATIONS

Invitation to Pay Additional Fees with Partial Search Report for Application No. PCT/US2010/050411 mailed on Feb. 3, 2011, 9 pages.

International Preliminary Report on Patentability with Written Opinion for PCT Application No. PCT/US2010/050411, mailed Jul. 19, 2012; 14 pages.

Office Action for Chinese Patent Application 201010622470.3, mailed Mar. 22, 2013, 17 pages.

* cited by examiner

| Command | Payload |
|---|---|
| RegisterDescriptor | HID descriptor for the accessory, a country code, a USB vendor ID, and a USB product ID |
| UnregisterDescriptor | Descriptor ID of the accessory to be unregistered |
| AccReport | Report Type and Report Data |
| PCDReport | Report Type and Report Data |

ACCESSORY FOR A PORTABLE COMPUTING DEVICE

CROSS-REFERENCES TO RELATED APPLICATIONS

This application claims benefit under 35 USC §119(e) to U.S. Provisional Patent Application No. 61/292,640 filed Jan. 6, 2010 and entitled "Keyboard Dock For A Portable Computing Device" the disclosure of which is incorporated by reference in its entirety for all purposes.

BACKGROUND

The present disclosure generally relates to portable computing devices and in particular to accessories for use with a portable computing device.

Computing devices, e.g., personal computers, have been in use for several decades. Computing devices are used for performing several tasks, from the simple to some of the most complex tasks. Computing devices can be generally categorized into portable, e.g., a laptop PC or a PDA, and non-portable, e.g., a desktop PC.

In the past decade, portable computing devices have gained popularity due to their portability and ability to manage multiple tasks. For example, a portable computing device, e.g., a personal digital assistant, can provide ability to check and respond to emails, manage meetings, display graphics and video, and play music. Most of the portable computing devices in use today either do not have a keyboard or have a keyboard that is small and inconvenient to use. In addition, integrated keyboards often have less functionality than a traditional keyboard.

A portable computing device can include one or more connectors or ports that can be used to interface with other devices. For example, the connector or port can enable the portable computing device to be inserted into a docking system, or receive an accessory device.

SUMMARY

Certain embodiments of the present invention include an accessory for a portable computing device. The accessory can include a connector interface for connecting to the portable computing device and an additional connector interface to connect to another accessory that can be used with the portable computing device. In some embodiments, the accessory can include a metal mass that can provide mechanical stability to the accessory and in addition can also provide a ground path for the accessory and associated circuitry.

In some embodiments, the accessory can be configured to be operable at multiple voltage levels. In this instance, when an additional accessory is connected to the portable computing device via the accessory, the accessory can operate at the same voltage level as the additional accessory even though the normal operating voltage of the accessory is different from the operating voltage of the additional accessory.

In some embodiments, the accessory can communicate with the portable computing device using a portable computing device specific protocol. A key press event generated by a keyboard, e.g., a USB HID event, can be packaged using the portable computing device specific protocol to create a portable computing device specific protocol packet. The portable computing specific protocol packet including the key press event can be communicated to the portable computing device for interpretation. The key press (HID) events generated by a keyboard included in the accessory can be included as the payload of a portable computing device specific protocol command and sent over to the portable computing device. The portable computing device can parse the command and send the one or more HID events received from the accessory to a HID layer within its USB stack for interpretation and processing.

The following detailed description, together with the accompanying drawings will provide a better understanding of the nature and advantages of the present invention.

DETAILED DESCRIPTION

Embodiments of the present invention provide an accessory for use with a portable computing device. The accessory many include various types of user input devices such as touch screen, touch pad, scroll wheel, click wheel, dial, button, keypad, microphone, or the like. While some embodiments are described below with specific reference to a keyboard as the user input device, one skilled in the art with access to the present disclosure will realize that any user input device (or devices) may be incorporated into an accessory without departing from the spirit and scope of the claims and that some accessories need not provide user input devices at all.

Certain embodiments of the present invention relate to an accessory for use with a portable computing device (PCD). The accessory can provide an interface for connecting to the portable computing device. In some embodiments, the accessory can include an additional interface to connect other accessories to the portable computing device via the accessory.

In some embodiments, the accessory can provide a low-loss signal pass-through capability wherein the accessory can be transparent to the other accessory that is connected to the portable computing device via the accessory. In some embodiments, the accessory can include a metal mass that can provide stability and support for the accessory and in addition, can provide a ground path for the electronics included in the accessory.

Figure 1A:
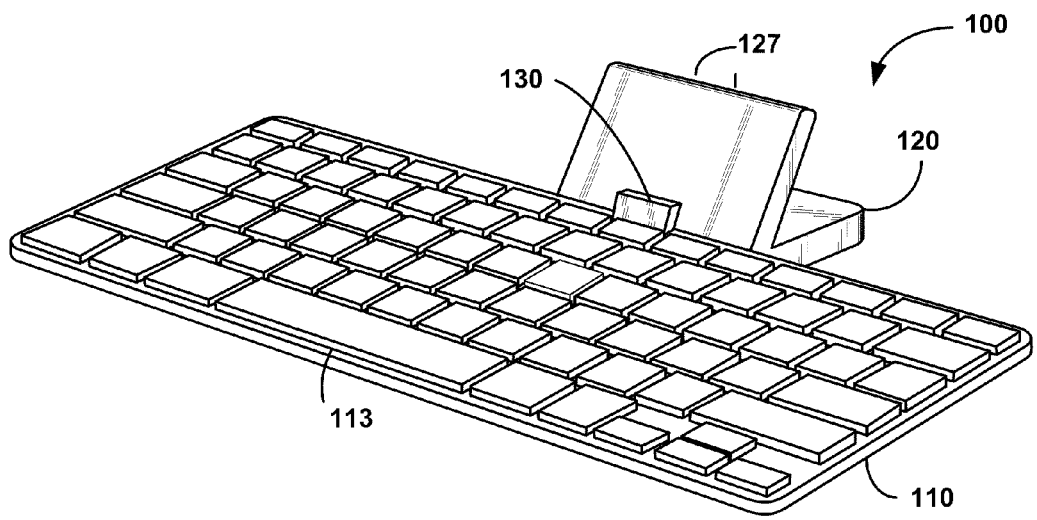
FIG. 1A is a front view of a keyboard accessory according to an embodiment of the present invention.

FIG. 1A illustrates a perspective view of a keyboard accessory 100 according to an embodiment of the present invention. Keyboard accessory 100 can include a keyboard 110 and a pedestal 120. Pedestal 120 can include a portable computing device (PCD) interface connector 130 that can be used to connect a PCD (not shown) to keyboard pedestal 120. Pedestal 120 can house control circuitry and other electronics to manage communications between keyboard accessory 100, the PCD, and any other accessory coupled to the PCD. Pedestal 120 can also include an accessory port for connecting additional accessories to the PCD (not shown in FIG. 1A). The supporting electronics for communicating and managing the other accessory can be housed within pedestal 120. In some embodiments, pedestal 120 can be designed as an enclosure and can be made from various materials including metal and/or plastic. Keyboard 110 can be similar to any standard keyboard currently available or can be a customized keyboard configured to be operable with the PCD. Keyboard 110 can include a keypad 113, which can include, e.g., a standard QWERTY keypad, a numeric keypad, etc. Keyboard accessory 100 can be designed to work with a variety of PCDs, e.g., personal digital assistants, computers without a keyboard, etc. In some embodiments, keyboard 110 can be oriented at an angle of between 4° and 9° relative to the top surface of pedestal 120.

Figure 1B:
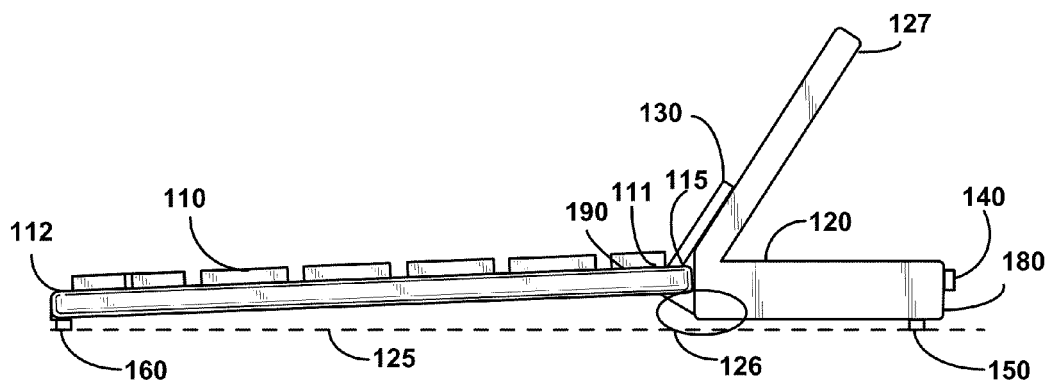
FIG. 1B is a side view of a keyboard accessory according to an embodiment of the present invention.

FIG. 1B illustrates a side view of keyboard accessory 100 according to an embodiment of the present invention. As described above, pedestal 120 can include an accessory port 140 that can be used to connect another accessory to the PCD via the keyboard accessory. In some embodiments, accessory port 140 can be located at a backside of pedestal 120. Accessory port 140 can be used to connect another accessory to the PCD, e.g., a GPS receiver or a power supply, via the keyboard accessory. Accessory port 140 can include a 30-pin connector similar to the connector used in the iPod® and iPhone® products manufactured by Apple Inc. In some embodiments, a center to center spacing between PCD connector interface 130 and accessory port 140 can be between 40 mm and 70 mm. In some embodiments, pedestal 120 can have a support structure 150 attached to a lower surface of the pedestal. Support structure 150 can run horizontally along the width of pedestal 120 and can be located along a lower edge 180 that is farthest away from the keyboard. Support structure 150 can protrude vertically downward from the lower surface of pedestal 120 to a predetermined distance. In some embodiments, the predetermined distance can be between 1 mm and 2 mm. In some embodiments, a length of support structure 150 can be between 120 mm and 140 mm and the width of support structure 150 can be between 55 mm and 80 mm. In some embodiments, there can be no support structure along a lower edge 190, of pedestal 120, which is closest to keyboard 110. In some embodiments, pedestal 120 can also include a PCD support plate 127. PCD support plate 127 can be used to support the PCD while the PCD is connected to the keyboard accessory. PCD support plate 127 can be located such that when a PCD is connected to the keyboard accessory, a backside of the PCD is in contact with PCD support plate 127. In some embodiments, PCD support plate 127 can be oriented vertically from the top surface of pedestal 120. In some embodiments, PCD support plate 127 can be oriented at an angle of between 15° and 35° relative to a surface perpendicular to the top surface of pedestal 120. In some embodiments, PCD support plate 127 can rise to a height of between 25 mm and 35 mm from the top surface of pedestal 120. In some embodiments, support structure 150 can be a formed in shape of a strip and can run along the entire width of pedestal 120 as described below in reference to FIG. 1C.

PCD interface connector 130 can be used for interfacing with a PCD. In some embodiments, PCD interface connector 130 can be rotatable or movable along multiple axes for ease of connection and disconnection of the PCD and/or allow a range of rest angles for the PCD when docked. Details of the PCD interface connector are described in co-pending U.S. patent application Ser. No. 12/652,018 filed on Jan. 4, 2010. Keyboard 110 can be attached to a top edge 115 of pedestal 120 on one end 111 and can extend forward and downward from edge 115. Keyboard 110 can have one or more support feet 160 attached to a lower surface near its other end 112, which is not connected to edge 115. In some embodiments, diameter of each support feet 160 can be between 7 mm and 9 mm. In some embodiments, one support feet 160 each can be located at the two corners of the end 112 and can have a center-to-center spacing of between 240 mm and 270 mm. Support feet 160 can extend vertically downward from the lower surface of keyboard 110 to a predetermined distance. In some embodiments, the predetermined distance can be between 1 mm and 2 mm. In some embodiments, when keyboard accessory 100 is resting on a surface 125 (dotted line), support feet 160 of the keyboard and support structure 150 of the pedestal can be concurrently in contact with surface 125 thereby providing a stable environment in which to use keyboard 110 and holding the lower surface of pedestal 120 above the surface. In particular, region 126 near the lower surface of pedestal 120 is held away from surface 125. Thus, stability of entire keyboard accessory 100 can be achieved using just three supports, i.e. support structure 150 and two support feet 160.

Figure 1C:
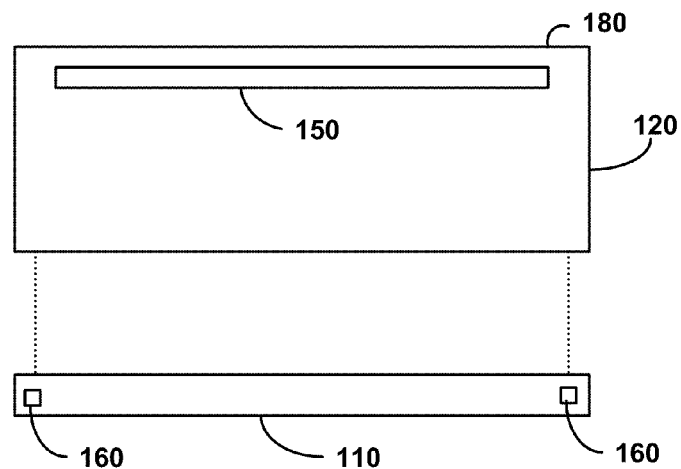
FIG. 1C is a bottom view of the keyboard accessory according to an embodiment of the present invention.

FIG. 1C illustrates a bottom view of keyboard accessory 100 illustrating support structure 150 and support feet 160 according to an embodiment of the present invention. As illustrated in FIG. 1C, support structure 150 can be attached to the lower surface of pedestal 120. In one embodiment, support structure 150 can run along the lower edge 180 of pedestal 120. One skilled in the art will realize that the shape and size of support structure 150 is not limited to the one illustrated in FIG. 1C. Support feet 160 can be attached to the lower surface of keyboard 110 at the two corners. One skilled in the art will realize that support feet 160 can be located at other places along the lower surface of keyboard 110. The arrangement of support feet 160 and support structure 150 provides a stable three-point support on planar or approximately planar surfaces, which can reduce or eliminate rocking or other movement of keyboard 110 during use. In addition, depending on the height of support feet, an interesting visual illusion can be created in that region 126 (shown in FIG. 1A) can appear to be touching the surface when in fact it is not.

Figure 1D:
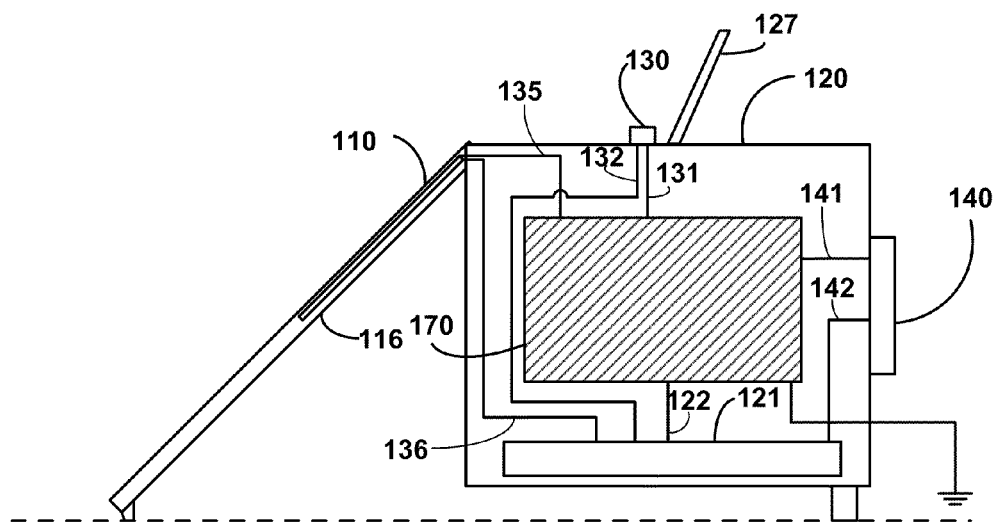
FIG. 1D is a cross-sectional view of the keyboard accessory according to an embodiment of the present invention.

FIG. 1D illustrates a cross-sectional view of keyboard accessory 100 according to an embodiment of the present invention. FIG. 1D illustrates a slightly enlarged pedestal section in order to properly show the details within the pedestal. As shown in FIG. 1D, keyboard 110 can include a keyboard control board 116 that can support keypad 113 and manage keyboard functions. Keyboard control board 116 can include a keyboard controller (not shown) and associated circuitry to convert a key press event to an appropriate signal to be sent to a PCD connected to keyboard accessory 100. In some embodiments, pedestal 120 can include a accessory control board 121 that can control the overall operation of keyboard accessory 100. Accessory control board 121 can be a printed circuit board supporting a microprocessor or microcontroller, memory devices, and interconnects for exchanging signals with interface connectors 130 and 140. In some embodiments, keypad 110 can be connected to metal block 170 via a connection path 135 and to accessory control board 121 via a connection path 136. PCD interface connector 130 can be connected to metal block 170 via a connection path 131 and to accessory control board 121 via a connection path 132. Accessory port 140 can be connected to metal block 170 via a connection path 141 and to accessory control board 121 via a connection path 142. Accessory control board 121 can be connected to metal block 170 via a connection path 122.

In some embodiments, pedestal 120 can include a metal mass 170. Metal mass 170 can provide stability and support for keyboard accessory 100. In some embodiments, metal mass 170 can consist primarily of zinc. In other embodiments, metal mass 170 can include copper, aluminum, steel, or combinations thereof. In some embodiments, metal mass 170 can have a length of between 125 mm and 145 mm, a width of between 65 mm and 75 mm, and a thickness (or height) of between 36 mm and 50 mm. In some embodiments, metal mass 170 can be shaped as a block, e.g., a rectangle, or any other shape as desired. In some embodiments, metal mass 170 occupies between 45% and 55% of the volume of pedestal 120 and can weigh between 130 grams and 145 grams, while the overall weight of keyboard accessory 100 can be between 550 grams and 650 grams.

In some embodiments, in addition to providing stability and support for keyboard accessory 100, metal mass 170 can also provide a ground path for the various electronic components of keyboard accessory 100. For instance, keyboard control board 116, accessory control board 121, PCD interface connector 130, and accessory port 140 can all be coupled to metal mass 170, which can provide a ground path to all these components.

Figure 2A:
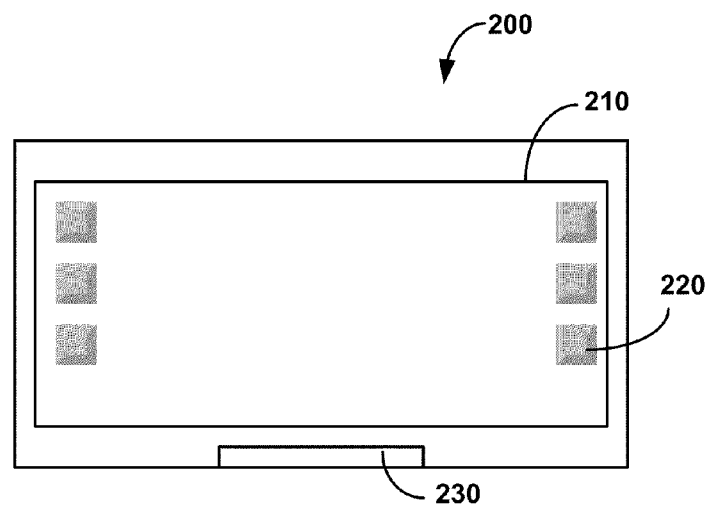
FIG. 2A is a front view of a portable computing device according to an embodiment of the present invention.

As described above, a PCD can be connected to keyboard accessory 100 via PCD interface connector 130. A PCD can be any device that can perform computations, play video or music, connect to the Internet and have browsing capability, and the like. FIG. 2A illustrates a portable computing device (PCD) according to an embodiment of the present invention. PCD 200 can include a display 210, one or more input devices 220, and an accessory I/O interface 230.

Display 210 can be a touch screen in some embodiments and be capable of displaying graphics and other information of varying resolutions. In some embodiments, display 210 can be operated using a stylus or using human touch.

User input devices 220 can be used to provide input to PCD 200. The input may be in the form of selecting a choice offered on display 210, clicking a button on display 210, etc. In some embodiments, user input devices 220 can be discrete buttons that can be individually operated to provide input to PCD 200. In other embodiments, user input devices 220 can be implemented as icons displayed on display 210. A user can activate the icons to control the functionality of PCD 200.

Accessory I/O interface 230 can be used to connect PCD 200 to a keyboard accessory or any other accessory. In some embodiments, the accessory I/O interface 230 can be a 30-pin connector corresponding to the connector used on iPod® products manufactured and sold by Apple Inc. Alternatively or additionally, accessory I/O interface 230 can include a different connector and/or wireless interface (e.g., Bluetooth or the like). In some embodiments, accessory I/O interface 230 can include more than one connector.

Figure 2B:
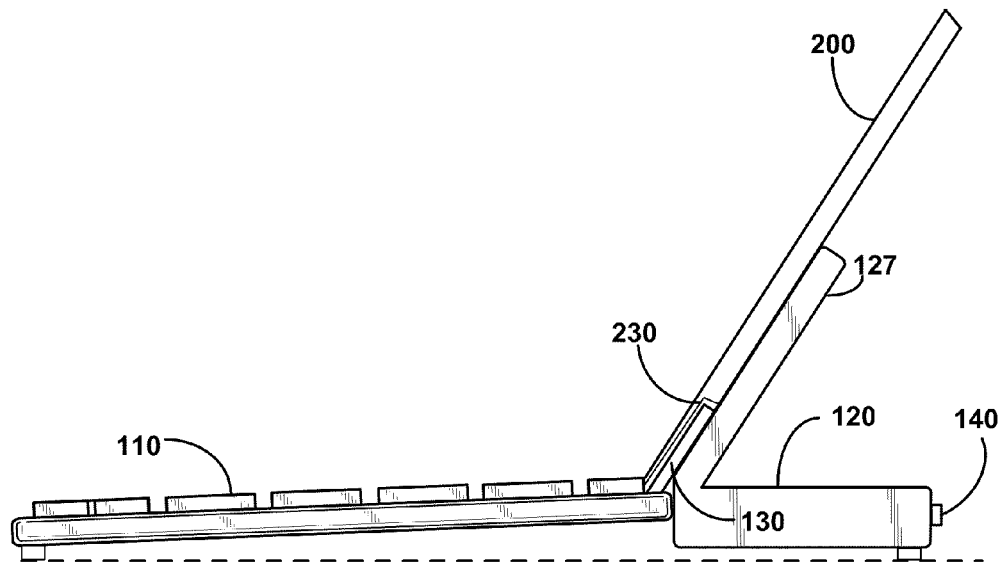
FIG. 2B is side view showing a portable computing device coupled to the keyboard accessory according to an embodiment of the present invention.

FIG. 2B illustrates PCD 200 connected to keyboard accessory 100 via the PCD interface 130 and accessory I/O interface 230. Once connected, PCD 200 can recognize keyboard accessory 100 and the user may start using the keyboard. In some embodiments, the PCD can be positioned in one of many positions supported by rotatable PCD interface connector 130. In some embodiments, PCD 200 can be connected to and disconnected from keyboard accessory 100 using just one hand and without the need to hold down keyboard accessory 100 during the connection or the disconnection process.

Figure 3:
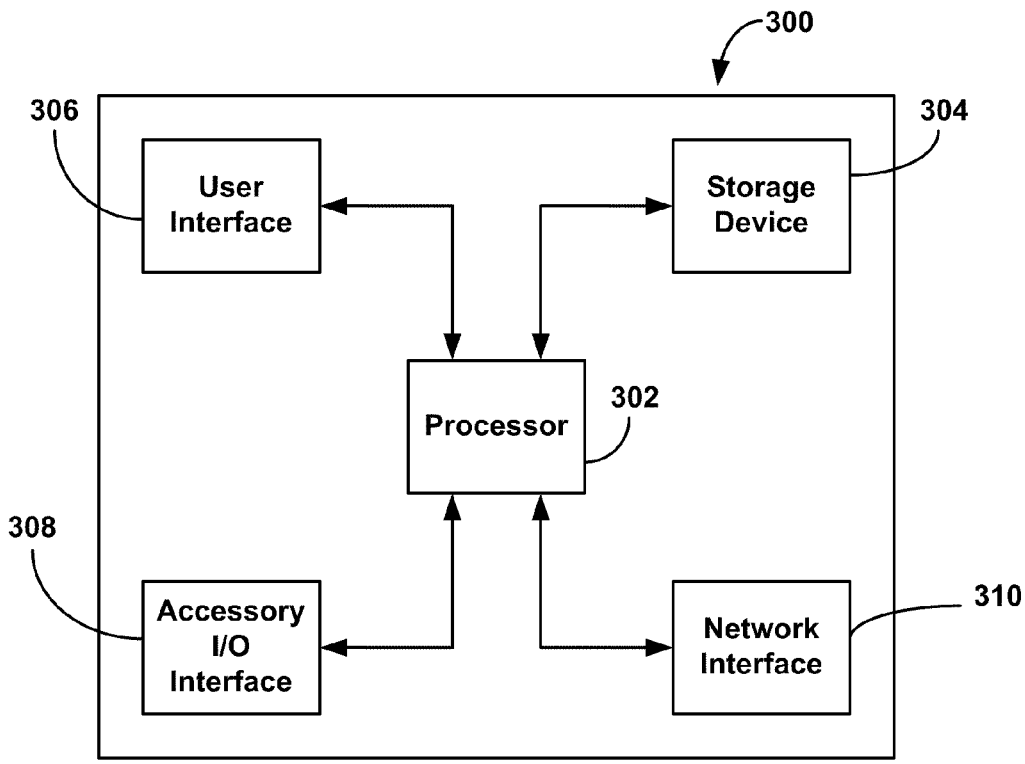
FIG. 3 is a block diagram of a portable computing device according to an embodiment of the present invention.

FIG. 3 is a block diagram of a PCD 300 according to an embodiment of the present invention (e.g., implementing PCD 200 of FIG. 2A). PCD 300 can include a processor 302, a storage device 304, a user interface 306, an accessory input/output (I/O) interface 308, and a network interface 310.

Processor 302, which can be implemented as one or more integrated circuits (e.g., a conventional microprocessor or microcontroller), can control the operation of PCD 300. For example, in response to user input signals provided by user interface 306, processor 302 can communicate with an accessory connected via accessory I/O interface 308. In some embodiments, processor 302 can communicate directly with an accessory connected to accessory port 140 of keyboard accessory 100.

Storage device 304 can be implemented, e.g., using disk, flash memory, or any other nonvolatile storage medium. In some embodiments, storage device 304 can store documents, graphics, media assets, or the like, that can be manipulated by PCD 300. Storage device 304 can also store information about various accessories that can be used with PCD 300. Storage device 304 can also store other information such as scheduled appointments and events, notes, and/or other personal information. In some embodiments, storage device 304 can store one or more programs to be executed by processor 302 (e.g., video game programs, personal information management programs, image processing application, media playback programs, word processing programs, presentation applications, etc.).

User interface 306 can include input controls such as a touch screen, touch pad, scroll wheel, click wheel, dial, button, keypad, microphone, or the like. User interface 306 can also include one or more user output devices, such as indicator lights, speakers, headphone jacks or the like, together with supporting electronics (e.g., digital-to-analog or analog-to-digital converters, signal processors or the like). A user can operate the various input controls of user input interface 306 to invoke the functionality of PCD 300 and can view and/or hear output from PCD 300.

Accessory I/O interface 308 can allow PCD 300 to communicate with various accessories, e.g., keyboard accessory 100. For example, accessory I/O interface 308 can support connections to a remote control unit, an external speaker accessory, an external video device, or the like. In some embodiments, the various accessories can be connected to keyboard accessory 100 and PCD 300 can communicate directly with the connected accessories. In some embodiments, accessory I/O interface 308 includes a 30-pin connector similar to the connector used on iPod® products manufactured and sold by Apple Inc. Alternatively or additionally, accessory I/O interface 308 can include a different connector and/or wireless interface (e.g., Bluetooth or the like). In some embodiments, accessory I/O interface 308 can include more than one connector.

Network interface 310 can allow PCD 300 to communicate with other devices on a network and exchange information with the other devices. In some embodiments network interface 310 can include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), GPS receiver components, and/or other components. In some embodiments network interface 310 can provide wired network connectivity (e.g., Ethernet) in addition to or instead of a wireless interface. Network interface 310 can be implemented using a combination of hardware (e.g., antennas, modulators/demodulators, encoders/decoders, and other analog and/or digital signal processing circuits) and software components.

In some embodiments, PCD 300 can provide power to the keyboard accessory and to any other accessory connected to the keyboard accessory. The power can be routed using accessory I/O interface 308.

Figure 4:
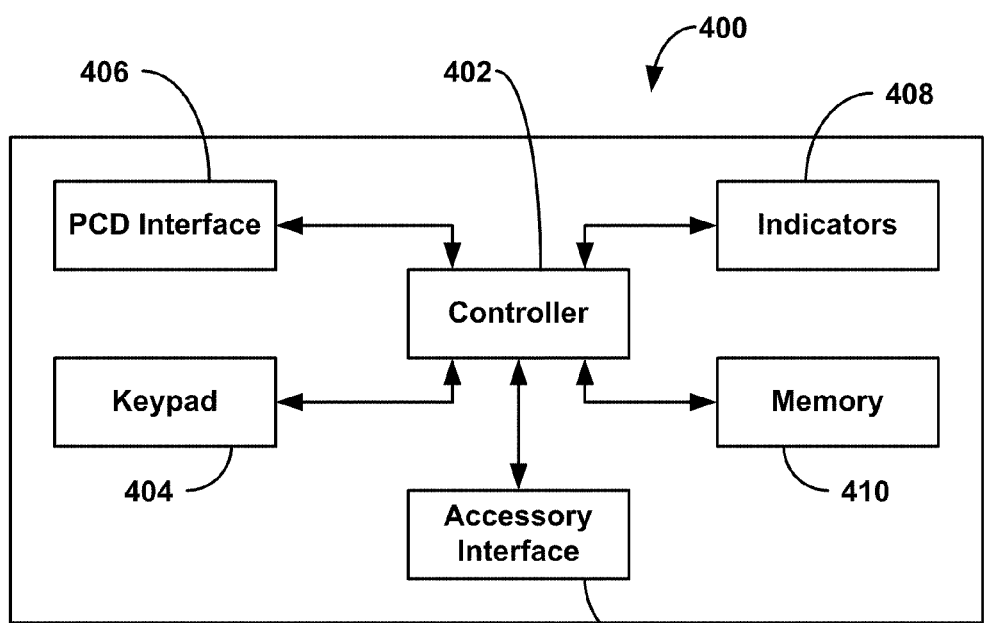
FIG. 4 is a block diagram of a keyboard accessory according to an embodiment of the present invention.

FIG. 4 is a block diagram of a keyboard accessory 400 according to an embodiment of the present invention. Keyboard accessory 400 can include a controller 402, a keypad 404, a PCD interface 406, one or more indicator devices 408, memory 410, and an accessory interface 412.

Controller 402, which can be implemented as one or more integrated circuits (e.g., a conventional microprocessor or microcontroller), can control the operation of keyboard accessory 400. For example, controller 402 can manage the communications between keyboard accessory 400 and a PCD connected to the keyboard accessory via PCD interface 406. In some embodiments, controller 402 can also manage communications between keyboard accessory 400 and another accessory coupled to the keyboard accessory via accessory interface 412. In some embodiments, controller 402 can be part of control circuitry designed to control the operation of the keyboard accessory.

Keypad 404 can be similar to any conventional keypad available in the market. Each key in the keypad corresponds to a character or special function. When a particular key is pressed, controller 402 located in the keyboard can sense the key press and can generate a key press event signal corresponding to the key pressed. Controller 402 can then send the key press event signal to processor 302 of PCD 300 via PCD interface 406 and accessory interface 308. Processor 302 can receive the signal bits corresponding to the key press event and can decode them into the appropriate key press. The PCD can then decide what action to perform based on the key pressed, e.g., display a character on the screen, or perform some action. When the key is released, a break code can be sent to the PCD to indicate the previously pressed key is no longer pressed. In some embodiments, a PCD connected to keyboard accessory 400 can be awakened from its hibernation state by pressing a key on keypad 404. Embodiments with this feature are described in co-pending U.S. Provisional Patent Application No. 61/292,626 filed on Jan. 6, 2010.

PCD interface 406 can allow keyboard accessory 400 to communicate with a PCD. As described above, a PCD can be a media player, a personal digital assistant, a portable computer, or the like. In some embodiments, PCD interface 406 can include a 30-pin connector complementary to the connector used on iPod® products manufactured and sold by Apple Inc. Alternatively or additionally, PCD interface 406 can include a different connector and/or wireless interface (e.g., Bluetooth or the like). In some embodiments, PCD interface 406 can include more than one connector. In some embodiments, PCD interface 406 can communicate the key press events from keypad 404 to the PCD and communicate the commands/signals from the PCD to keyboard accessory 400.

Indicator devices 408 can include one or more illuminating devices, e.g., light emitting diodes (LED), or audio devices. Indicator devices 408 can visually or audibly communicate status information about the keyboard accessory to the user. For example, indicator devices 408 can include an LED to indicate PCD connection status. In some embodiments, the LED can be illuminated whenever a PCD is connected to the keyboard accessory and is providing power to the keyboard accessory. In some embodiments, indicators 408 can communicate accessory status, status of certain key modifiers, e.g., CAPSlock, Numlock, etc. and other events. In some embodiments, indicator devices 408 can also include textual indicators that convey a particular status. For example, when a PCD is connected to the keyboard accessory, an indicator displaying "PCD connected" can illuminate to provide information to the user that the PCD is connected and operational. In some embodiments, indicator devices 408 may also include a speaker for delivering audio such as beeps, spoken words, etc. to indicate status of the keyboard accessory and/or the PCD. In some embodiments, indicator devices 408 can also provide audio output based on signals received from the PCD.

Memory 410 can be implemented, e.g., using disk, flash memory, or any other nonvolatile storage medium. In some embodiments, memory 410 can store the firmware for the keyboard accessory. In some embodiments, memory 410 can store information about various accessories that can be connected to the PCD via the keyboard accessory. In this instance, when an accessory is connected to the keyboard accessory, via accessory interface 412, the keyboard accessory can determine which accessory is connected based on certain signals and information provided by the accessory. Based on the accessory connected, the keyboard accessory can change its own configuration in order to be operable with the accessory. In some embodiments, memory 410 can store information about one or more PCDs. For example, when a particular PCD is connected, the keyboard accessory can determine the type of PCD, e.g., a media player or a portable computer, and automatically operate in a configuration that is compatible with the PCD.

Accessory interface 412 can allow an accessory to be connected to keyboard accessory 400. In some embodiments, accessory interface 412 can include a 30-pin connector corresponding to the connector used on iPod® products manufactured and sold by Apple Inc. Alternatively or additionally, accessory interface 412 can include a different connector and/or wireless interface (e.g., Bluetooth or the like). In some embodiments, accessory interface 412 can include more than one connector to enable connections with more than one accessory.

In some embodiments, keyboard accessory 400 can act as an intermediary for the accessory connected to keyboard accessory 400. For example, when an accessory is connected to keyboard accessory 400, keyboard accessory 400 can act as a pass-through entity for the accessory. In this instance, the accessory can directly communicate with a connected PCD without realizing the presence of keyboard accessory 400 even though the accessory is actually directly connected only to keyboard accessory 400 and not to the PCD. Details of operating keyboard accessory 400 as an intermediary are described in co-pending U.S. Provisional Patent Application No. 61/292,619 filed on Jan. 6, 2010.

In some embodiments, power for operating the keyboard accessory can be provided by the PCD connected to the keyboard accessory. The keyboard accessory can be designed to be operable at multiple operating voltages. When only the PCD is connected to the keyboard accessory, the keyboard accessory can operate at a first voltage, e.g., 3.3 volts, which can be supplied by the PCD. When an accessory is connected to the PCD via the keyboard accessory, the PCD can also supply power to the accessory via the keyboard accessory. In some embodiments, the accessory can operate at a second voltage that is different from the first voltage, e.g., 4.2 volts. In some embodiments, the keyboard accessory can reconfigure itself to operate at the second voltage in order to operate seamlessly with the PCD and the accessory. Details of this operation are described below in relation to FIG. 8. It is to be noted that the embodiment described above is not limited to accessories that include keyboards or input devices. Any functional circuitry within any accessory can be configured to operate at two different voltage levels as described above.

It will be appreciated that the system configurations and components described herein are illustrative and that variations and modifications are possible. The PCD and/or the keyboard accessory may have other capabilities not specifically described herein (e.g., mobile phone, global positioning system (GPS), broadband data communication, Internet connectivity, etc.).

Connectors at the various interfaces can be complementary or not as desired. Where two connectors are not complementary, an adapter can be provided to connect the two devices. Further, in some embodiments, some of the connections can be wireless, and connectors can be omitted where wireless interfaces are provided.

Further, while the PCD and the keyboard accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Accessory I/O interface 308 of PCD 300 and PCD interface 406 of keyboard accessory 400 allow PCD 300 to be connected to keyboard accessory 400 and subsequently disconnected from keyboard accessory 400. As used herein, PCD 300 and keyboard accessory 400 are "connected" whenever a communication channel between accessory I/O interface 308 and PCD interface 406 is established and are "disconnected" whenever the communication channel is terminated. Connection can be achieved by physical attachment (e.g., between respective mating connectors of PCD 300 and keyboard accessory 400), by an indirect connection such as a cable, or by establishing a wireless communication channel. Similarly, disconnection can be achieved by physical detachment, disconnecting a cable, powering down PCD 300, or closing the wireless communication channel. Thus, a variety of communication channels can be used, including wired channels such as USB, FireWire, or universal asynchronous receiver/transmitter ("UART"), or wireless channels such as Bluetooth and WiFi. In some embodiments, multiple communication channels between a PCD and the keyboard accessory can be opened concurrently, or a PCD can be connected to multiple accessories via the keyboard accessory, with each accessory using a different communication channel.

Regardless of the particular communication channel, as long as PCD 300 and keyboard accessory 400 are connected to each other, the devices can communicate by exchanging commands and data according to a PCD accessory protocol customized to support communications between a PCD and any of a range of possible accessories. The PCD accessory protocol can define a format for sending messages between PCD 300 and keyboard accessory 400. For instance, the PCD accessory protocol can specify that each message be sent in a packet with a header and an optional payload. The header provides basic information (e.g., a start indicator, length of the packet, and a command to be processed by the recipient), while the payload provides any data associated with the command; the amount of associated data can be different for different commands, and some commands can provide for variable length payloads. In various embodiments, the PCD accessory protocol can define specific commands to indicate an action to be taken by the recipient; to signal completion of a task, change of state, or occurrence of an error; and/or to identify the nature of the associated data. In some embodiments, the commands can be defined such that a particular command is valid in only one direction. The packet can also include error detection or error correction codes as known in the art.

The PCD accessory protocol can define a number of "lingoes," where a "lingo" is a group of related commands that can be supported (or unsupported) by various classes of accessories. In some embodiments, a command can be uniquely identified by a first byte identifying the lingo to which the command belongs and a second byte identifying the particular command within the lingo. Other command structures can also be used. It is not required that all accessories, or all PCDs to which an accessory can be connected, support every lingo defined within the PCD accessory protocol.

In some embodiments, keyboard accessory 400 and every PCD 300 that are designed to be interoperable with each other support at least a "general" lingo that includes commands common to all such devices. The general lingo can include commands enabling the PCD and the accessory, e.g., keyboard accessory, to identify themselves to each other and to provide general information about their respective capabilities, including which (if any) other lingoes each supports. The general lingo can also include authentication commands that the PCD can use to verify the purported identity and capabilities of the keyboard accessory and any accessory (or vice versa), and the keyboard accessory and the accessory (or PCD) can be blocked from invoking certain commands or lingoes if the authentication is unsuccessful.

In some embodiments, the keyboard accessory can communicate with the PCD by sending and receiving information packets using the PCD accessory protocol. In some embodiments, the keyboard accessory can represent a keystroke as a USB Human Interface devices (HID) event. The keyboard accessory can then include a USB HID event report into a packet that conforms to the PCD accessory protocol and send that packet to the PCD. The PCD can parse and interpret the received packet to determine which key was pressed. The USB HID protocol specifies certain reports that may be used by a HID such as a keyboard, in order to communicate with other devices. A detailed explanation of the various HID reports is provided in the specification for USB Device Class Definition for Human Interface Devices (HID), firmware specification, Version 1.11.

Figures 5, 6:
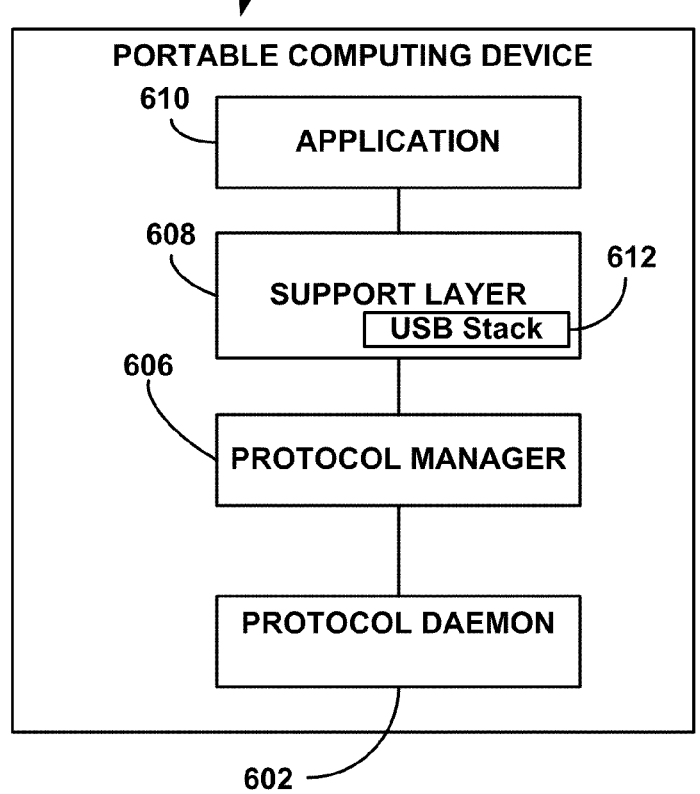
FIG. 5 is a table illustrating commands that can be used to communicate key press events between the keyboard accessory and the portable computing device according to an embodiment of the present invention.
FIG. 6 is a functional block diagram of a software stack included in a portable computing device according to an embodiment of the present invention.

FIG. 5 shows a table 500 listing some of the commands of the PCD accessory protocol that can be used to communicate data between the PCD and the keyboard accessory according to an embodiment of the present invention.

The keyboard accessory can send a RegisterDescriptor command to the PCD after a PCD is connected to the keyboard accessory. The RegisterDescriptor command can include, as its payload, the HID descriptor for the keyboard, a country code, a USB vendor ID, and a USB product ID. Upon receiving the RegisterDescriptor command, the PCD can determine that the keyboard accessory is a HID device. In addition, the RegisterDescriptor command can also inform the PCD that the connected accessory is a keyboard and that the PCD should expect HID events related to a keyboard to be received from the connected accessory. In some embodiments, the PCD can register multiple descriptors that may be associated with a single accessory or multiple accessories. In this instance, each descriptor can be assigned some unique identification, e.g., a number or an alphanumeric code, in order to track and manage the descriptor.

The keyboard accessory can send an UnregisterDescriptor command to the PCD. The UnregisterDescriptor command notifies the PCD that the keyboard accessory will no longer send any keyboard related HID events to the PCD. The UnregisterDescriptor command can include, as its payload, the unique identification of a descriptor associated with the accessory that is to be unregistered. For example, the keyboard accessory may send the UnregisterDescriptor command before the PCD is disconnected from the keyboard accessory or as part of the disconnection process.

The keyboard accessory can send an AccReport command to the PCD. The AccReport command can include a report type and one or more HID events related to one or more key press actions performed on the keyboard accessory. In one instance, the AccReport command can be sent to the PCD at regular intervals, e.g., every 8 milliseconds. In some embodiments, if there are multiple HID events that occur between the last transmission and the next transmission, e.g., within 8 milliseconds of the last transmission, the multiple HID events can be aggregated and sent to the PCD as a single packet every 8 milliseconds.

The PCD can send a PCDReport command to the keyboard accessory. The PCDReport command can include type of the report and report data that can include instructions for the keyboard accessory to perform an action. In some embodiments, the PCDReport command can include HID report information to set the keyboard accessory state based on the current PCD state, e.g., updating indicators 408 (e.g., CapsLock, NumLock, PCD power/charge, keyboard backlight, etc.). For example, a PCDReport command can include an instruction to turn on the CAPS lock indicator on the keyboard accessory in response to CAPS lock key press event received by the PCD from the keyboard accessory. In some embodiments, the PCDReport command can also be used to communicate error messages to the keyboard accessory.

In some embodiments, the keyboard accessory can send key press event commands to the PCD upon connection with the PCD. When the keyboard accessory is connected to the PCD, the keyboard accessory can send a RegisterDescriptor command to the PCD. The RegisterDescriptor command informs the PCD that the accessory connected is a keyboard and that the PCD should receive keyboard related HID events from the accessory, as described above. For example, when a user presses a key on the keypad, e.g., the "A" key, the keyboard generates a HID event associated with the key press and sends that HID event to the PCD using the PCD accessory protocol. Once the PCD receives the PCD accessory protocol command, it can parse the command to determine that the "A" key was pressed on the keypad and subsequently the PCD can display the character "A" on the display of the PCD. In some embodiments, the PCD can control the various indicator lights on the keyboard accessory based on input received from the keyboard accessory to indicate whether the correct key press event was received. For example, since the CAPS Lock key does not result in a character being displayed on the screen, a user would not know whether the PCD received the HID event associated with the CAPS lock key. In such an instance, after receiving the CAPS lock event, the PCD can send a command to the keyboard to illuminate an indictor associated with the CAPS lock key to provide a visual indication that the event was properly received by the PCD. In some embodiments, the PCD can control the brightness of the indicator devices on the keyboard accessory based on the ambient light in the environment surrounding the keyboard accessory, e.g., the brighter the room, the higher the illumination of the indicator devices.

Although the commands are described above in relation to a PCD and a keyboard accessory, it is to be noted that any device that is capable of implementing the PCD accessory protocol can use these commands to send and receive data.

As described above, the PCD and the keyboard accessory can communicate with each other using a PCD accessory protocol. In one embodiment, the PCD can receive a command sent via the PCD accessory protocol and can interpret the command to determine the key press event based on information included in the command. FIG. 6 illustrates a software stack 600 included in a portable computing device that can be used to interpret commands that can include USB HID reports, received from an accessory via a packet conforming to the PCD accessory protocol, according to an embodiment of the present invention. Software stack 600 can be implemented, e.g., in processor 302 of PCD 300 of FIG. 3.

Protocol daemon 602 within a PCD can control the PCD accessory protocol communications. In one embodiment, protocol daemon 602 can receive a PCD accessory protocol packet sent by an external device, e.g., the keyboard accessory, extract the command and any associated data, and deliver that message to a protocol manager 606. In another embodiment, protocol daemon 602 can receive an outbound message including a command and data of the PCD accessory protocol from protocol manager 606 and can generate a packet containing the message and transmit the packet to an accessory connected to the PCD, e.g., a keyboard accessory.

Protocol manager 606 can receive a PCD accessory protocol message from protocol daemon 602 and begin the process of interpreting the message. Protocol manager 606 can read the command code from the message provided by protocol daemon 602 and determine the nature of the command and any associated payload. Once protocol manager 606 determines the type of payload, it can deliver that payload to an application support layer 608 that acts as an intermediary between protocol manager 606 (and optionally other low-level device functions) and application 610. Application support layer 608 can provide various abstractions that hide implementation details from application programs 610. Thus, for example, application programs 610 can invoke communication with an accessory without knowing details of the accessory protocol commands or packet structures. In one embodiment, support layer 608 can include a conventional USB stack for processing USB reports such as HID reports. An example of support layer 608 is described in commonly-owned U.S. patent application Ser. No. 12/201,874, filed Aug. 29, 2008, and entitled "Support Layer for Enabling Same Accessory Support Across Multiple Platforms."

Support layer 608 can interpret the command and the data and instruct the corresponding application about an action to be performed based on the command.

Application 610 can include an operating system (OS) and/or one or more application programs implementing various functions of the PCD. Examples include an interface for navigating a database of media assets and for playing back assets of various types (e.g., audio, video, still images such as photos, etc.). Other examples include World Wide Web browsers, email programs, word processing programs, spreadsheet programs, presentation programs, personal information management applications (e.g., for managing calendar, tasks, contacts, etc.), geographic navigation programs (e.g., using GPS capability where present) and the like.

In some embodiments, protocol daemon 602 can receive a packet containing an AccReport command, extract the command and data (i.e., the HID report) and forward them to protocol manager 606. Protocol manager 606 can recognize the AccReport as indicating that the associated data corresponds to a USB HID report and direct the HID report to USB stack 612 within application support layer 608. USB stack 612 can determine that the USB HID report includes a key press event, e.g., related to the key 'A'. Thereafter, support layer 608 can inform the appropriate application that the 'A' key was pressed and the application can perform an action based on that information, e.g., displaying the character 'A' on the display of the PCD.

Similarly, if an application program 610 determines that an action of interest to the keyboard accessory should be taken, e.g., if caps lock should be enabled, the application program can instruct support layer 608 to enable a CAPSlock indicator on the keyboard accessory. Support layer 608 can instruct USB stack 612 to generate an outgoing USB HID report indicating that a CAPSlock indicator should be illuminated and can direct protocol manager 606 to propagate the outgoing HID report to the PCD. Based on the fact that the accessory communicates via the PCD accessory protocol and not USB, protocol manager 606 can generate a PCDReport command and send a message containing this command and the HID report to protocol daemon 602. Protocol daemon 602 can construct a PCD accessory protocol packet containing the PCDReport command and the outgoing HID report and can send that command to the accessory in accordance with the PCD accessory protocol.

Figure 7:
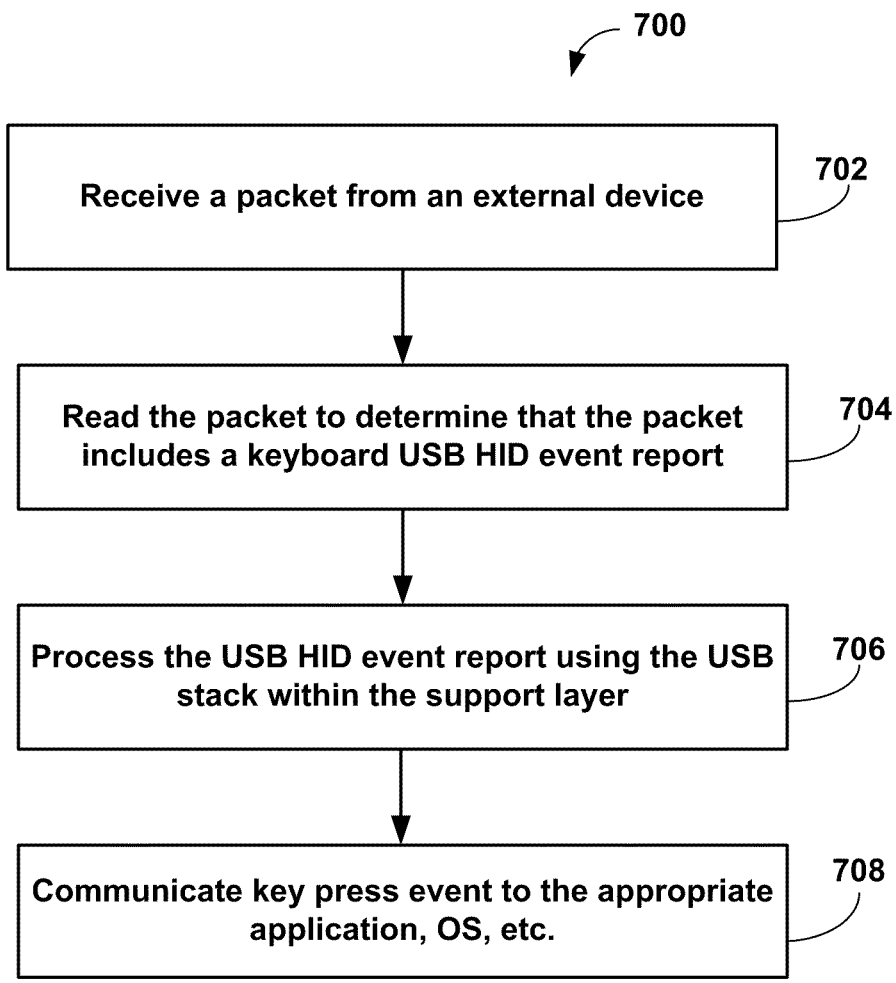
FIG. 7 is a flow diagram of a process for processing a portable computing device accessory protocol packet according to an embodiment of the present invention.

In one embodiment, the keyboard accessory can generate events related to key press and other operations performed using the keyboard. In some embodiments, the events can be generated as HID reports conforming to the USB standard. FIG. 7 is a flow diagram of a process 700 for communicating messages between a keyboard accessory (e.g., keyboard accessory 100 of FIG. 1) and a PCD (e.g., PCD 200 of FIG. 2) according to an embodiment of the present invention.

At block 702 a packet conforming to the PCD accessory protocol is received from an external device, e.g., a keyboard accessory. For example, the packet can include an AccReport command and a key press event report generated by the keyboard accessory. The packet can be received, e.g., by protocol daemon 602 of FIG. 6. The contents of the packet are determined at block 704.

At block 706, the packet is processed, e.g., by support layer 608, to determine the key press event. For example, the USB HID report can be processed by USB stack 612, which can determine the particular key press event that is included in the HID report. Once the key press event is determined, that information can be sent to the appropriate application program, operating system (OS) program, or other program at block 708. Upon receipt of the key press event information, a program can perform an action based on the key press information, e.g., displaying a character corresponding to the key press event on a display.

It will be appreciated that process 700 described herein is illustrative and that variations and modifications are possible. Acts described as sequential can be executed in parallel, order of acts can be varied, and acts can be modified or combined. For instance, some key press events can result in the PCD controlling an indicator on the keyboard accessory, e.g., pressing the CAPSlock can result in the CAPSlock indicator on the keyboard being illuminated based on a command received from the PCD. In other instances, the PCD accessory protocol packet may not include a key press event but rather include only configuration information of the keyboard accessory.

As described above, the one or more HID key press events generated by the keyboard accessory can be sent to the PCD in the form of a USB HID report. In some embodiments, every key press event can be sent as an 8-byte bit mask that is part of the USB HID protocol commands. In some embodiments, the USB HID report can be sent as the payload of a PCD accessory protocol command as described above. The controller within the keyboard accessory can receive the key press events and include one or more such events in a USB HID report to be included as a payload of a command for the PCD accessory protocol. The command can be then communicated to the PCD via the PCD interface connector. The PCD may receive the command via its accessory interface and parse the command to identify the contents of the command, e.g., as described above in relation to FIG. 5.

It will be appreciated that the processes described herein are illustrative and that variations and modifications are possible. The PCD can support any type of application, and applications can be launched or exited under control of a user or another process. It is contemplated that the lower level processes (support layer 608, protocol manager 606, and protocol daemon 602) can be implemented in software and/or firmware and configured to be automatically started at device powerup and to terminate only on power down or when various abnormal conditions are detected. The processes may go into inactive states to minimize resource consumption when not in use. Further, not all of the levels and processes shown herein are required; for instance, in some embodiments, applications might communicate directly with the protocol manager or the protocol daemon.

As described above, the keyboard accessory can be designed to be operable with additional accessories connected to the PCD via the accessory port 140 of the keyboard accessory. In many instances, the accessories connected via the accessory port 140 can have different operating voltages. In some instances, the operating voltage of an accessory can be different from the operating voltage of the keyboard accessory. In such instances, it can be advantageous to have the keyboard and the accessory operate at the same voltage since the operating voltage is provided by the PCD. By having a single operating voltage requirement under such circumstances, the PCD can easily and seamlessly operate with multiple accessories without the need for disconnecting accessories.

Figure 8:
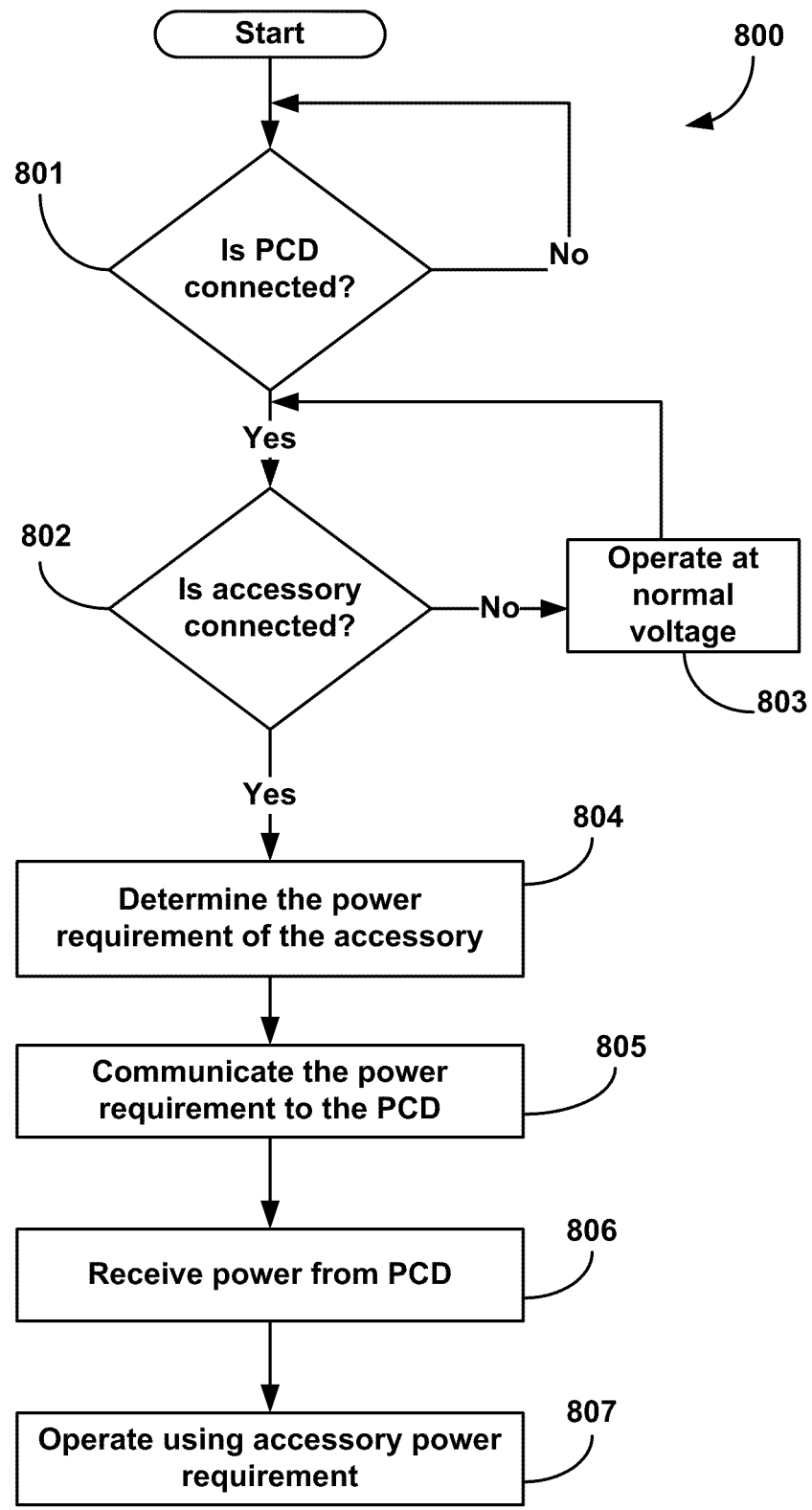
FIG. 8 is a flow diagram of a process for communicating instructions between the keyboard accessory and the portable computing device according to an embodiment of the present invention.

FIG. 8 is a flow diagram of a process 800 for operating the keyboard accessory according to an embodiment of the present invention. At block 801, the keyboard accessory can determine if a PCD is connected to it via the PCD interface. If it is determined that a PCD is not connected, the keyboard accessory can wait for a PCD to be connected. If it is determined at block 801 that a PCD is connected to the keyboard accessory, the keyboard accessory can check whether another accessory is connected to the keyboard accessory at block 802. If no other accessory is connected to the keyboard accessory, the keyboard can operate at its normal voltage, e.g., 3.3 volts, using the power provided by the PCD, at block 803. In addition, the keyboard accessory can keep checking whether an accessory is connected to the keyboard accessory. If at block 802 it is determined that an additional accessory is connected to the keyboard accessory, the keyboard accessory can determine the power requirements for the accessory at block 804. In some embodiments, the accessory can automatically send its power requirements to the keyboard accessory upon connection. In other embodiments, the keyboard accessory can determine a resistance value between two designated pins of accessory port 140, e.g., the accessory detect pin and the accessory ID pin, once the accessory is connected. The resistance value can be indicative of an operating voltage for the accessory. The keyboard accessory can then communicate the power requirement of the accessory to the PCD at block 805. The PCD upon receiving the power requirement determines the operating voltage requirement for the accessory. For example, the PCD may include a look-up table that lists various resistance values for accessories and their corresponding operating voltages.

The PCD can supply the required operating voltage to the accessory via the keyboard accessory. The keyboard accessory receives the voltage to operate the accessory, from the PCD, at block 806. The keyboard accessory can then act as conduit to supply the voltage received from the PCD to the accessory. In addition, in response to receiving the voltage from the PCD to operate the accessory, the keyboard accessory can start operating at the same voltage level as the accessory at block 807. In some embodiments, the keyboard accessory can receive a control signal from the PCD indicating that the PCD will supply a voltage equal to that of the operating voltage of the accessory. When the keyboard accessory receives the control signal, the keyboard accessory can change its operating voltage from its normal value to match the voltage provided by the PCD, which is the operating voltage of the accessory. For example, the normal operating voltage of the keyboard accessory can be 3.3 volts and the normal operating voltage of the accessory can be 4.2 volts. In the absence of the accessory, the keyboard accessory can operate at 3.3 volts being supplied by the PCD. However, after the accessory is connected, the keyboard accessory can reconfigure itself to operate at 4.2 volts, i.e., at the operating voltage of the accessory.

Enabling the keyboard accessory to operate at different voltages can allow various accessories to be connected to the keyboard accessory for use with the PCD without the need to disconnect the keyboard accessory from the PCD. This offers more flexibility in the choice of accessory that can be used with the PCD. In addition, the keyboard accessory can also be used to control the accessory if needed.

It will be appreciated that process 800 described herein is illustrative and that variations and modifications are possible. Acts described as sequential can be executed in parallel, order of acts can be varied, and acts can be modified or combined. For instance, the keyboard accessory may not request the power requirements from the accessory; instead the keyboard accessory will automatically determine the power requirements for the accessory based on identification of the accessory and accessing information stored in the keyboard accessory's memory that lists the power requirements for various accessories.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention can be encoded on various non-transitory computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. An accessory for use with a portable computing device, the accessory comprising:
   an accessory interface configured to connect to an additional accessory and to provide power to the additional accessory;
   a portable computing device interface configured to connect to the portable computing device and to receive power from the portable computing device; and
   circuitry configured to operate at either of a first operating voltage or a second operating voltage, the first operating voltage corresponding to the accessory and the second operating voltage corresponding to the additional accessory;
   wherein the circuitry is further configured to operate only at the second operating voltage if the additional accessory is connected to the accessory interface and to operate only at the first operating voltage if the additional accessory is not connected.

2. The accessory of claim 1 wherein the second operating voltage is higher than the first operating voltage.

3. The accessory of claim 1 wherein the circuitry is further configured to determine a resistance value corresponding to the second power requirement and communicate the resistance value to the portable computing device.

4. The accessory of claim 1 further including a metal mass configured to provide stability to the accessory and provide a ground path for the keypad and the circuitry.

5. The accessory of claim 4 wherein the metal mass consists primarily of zinc.

6. The accessory of claim 4 wherein the metal mass occupies between 45% and 55% of a volume of the pedestal.

7. A method for operating an accessory having a first operating power requirement, the method comprising, by the accessory:
   receiving, from an additional accessory connected to the accessory, information associated with a second operating power requirement for operating the additional accessory;
   communicating the information associated with second operating power requirement to a portable computing device connected to the accessory, wherein the second operating power requirement is different from the first operating power requirement;

receiving, from the portable computing device, a voltage corresponding to the second operating power requirement; and operating using only the voltage corresponding to the second operating power requirement.

8. The method of claim 7 wherein the first operating power requirement is lower than the second operating power requirement.

9. The method of claim 7 wherein receiving the information associated with the second operating power requirement includes determining a resistance value associated with the second operating power requirement.

10. The accessory of claim 1 wherein the circuitry is further configured to determine a power requirement for the additional accessory and communicate the power requirement to the portable computing device.

11. The accessory of claim 1 wherein the circuitry is further configured to change its operating voltage from the first operating voltage to the second operating voltage upon connection of the additional accessory.

12. The accessory of claim 1 wherein the circuitry is further configured to change its operating voltage from the first operating voltage to the second operating voltage based on a control signal from the portable computing device.

13. The method of claim 7 further comprising:

determining a power requirement for the additional accessory and communicating the power requirement to the portable computing device.

14. The method of claim 7 further comprising changing an operating voltage of the accessory from the first operating voltage to the second operating voltage upon connection of the additional accessory.

15. The method of claim 7 further comprising changing an operating voltage of the accessory from the first operating voltage to the second operating voltage based on a control signal from the portable computing device.

* * * * *